Patented Oct. 13, 1942

2,298,681

UNITED STATES PATENT OFFICE 2,298,681

INSECTICIDE

Gerald H. Coleman, Midland, Mich., assignor to The Dow Chemical Company, Midland, Mich., a corporation of Michigan No Drawing. Application July 26, 1939, Serial No. 286,587

9 Claims. (Cl. 167—24)

This invention relates to insecticides particularly adapted for the control of house flies, clothes moths, carpet beetles, and other household insect pests.

Many organic toxicants have been suggested for inclusion in liquid household insecticides and mothproofers. Certain liquid compositions have been unsatisfactory in that the residues therefrom are of such a crystalline nature as to stiffen or be dusted out of fabric materials. Other moth-proofing toxicants are highly volatile and impermanent in nature and are soon dissipated by vaporization from the material to which they are applied. Also, temporary protection only is accomplished by many compounds which are soluble in water or which decompose on weathering. Phenolic compounds heretofore employed frequently have had an undesirable odor, been irritating to the nose and throat, and corrosive to the skin. Other phenolic derivatives weaken the structure of fabrics and cause dyestuffs to fade or otherwise change color.

Petroleum distillate sprays comprising insecticidal plant products are widely used for the control of household insect pests. Pyrethrin-containing sprays have a quick paralyzing effect on flies, but the kill obtained is low compared with the knockdown of the insects. Sprays comprising rotenone have been found to give a high moribund kill but have a relatively slow rate of knockdown. A further disadvantage in the use of rotenone- or pyrethrin-containing compositions is that these toxicants are very unstable to heat and light, and upon storage lose their effectiveness to an appreciable degree.

I have discovered that solutions of the nuclear alkylated 2-hydroxy-diphenyls and chloro- and bromo-derivatives thereof are both toxic and repellent to common household insect pests, and are particularly valuable in the control of house-flies, clothes moths, carpet beetles, and the like. Such compounds may be characterized by the formula

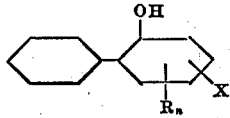

wherein R represents an alkyl radical containing not more than 6 carbon atoms, X represents halogen or hydrogen, and $n$ is an integer not greater than 2. These compounds are for the most part high boiling oily liquids, substantially insoluble in water. Solutions thereof in non-corrosive organic solvents have been found to be non-irritating, and relatively non-toxic to higher forms of animal life. Liquid compositions comprising from about 2 to 10 per cent by weight of these phenols may be advantageously employed as fly sprays. Such sprays give quick knockdowns and high kills, and are stable on exposure to air, light, and heat. The alkylated 2-hydroxy-diphenyls may also be employed to fortify pyrethrin- or rotenone-containing sprays whereby increased kills on flies and related insects are obtained therewith. A further advantage in the use of the combination of toxicants is that the phenolic material exerts a stabilizing effect upon the plant toxicant. The amount of the phenolic compounds preferably employed in combination with the natural occurring insecticidal plant products varies between about 5 and 50 grams per liter of spray solution.

In the protection of fur, hair, feathers, wool, and the like against the attack of clothes moths, carpet beetles, and related insects, solutions or dispersions containing from about 0.5 to about 15 per cent by weight of the alkyl substituted 2-hydroxy-diphenyls are employed. Fabrics impregnated with such solutions and thereafter dried are protected for a long period of time against attack by such insects, are not stained, deteriorated, or caused to develop any distinctive odor, or to become toxic to humans. Furthermore, the phenolic residues deposited in and on the fibers are not readily removed from the fabric by the action of water, soap solutions, or common petroleum distillate cleaning fluids, by weathering, volatilization, or sublimation.

The following examples are illustrative of certain modes in which my invention may be applied, but are not to be construed as limiting the same:

EXAMPLE 1

Mothproofing tests were carried out with solutions of alkylated phenyl-phenol compounds in various organic solvents to determine their efficiency against the larva of black carpet beetle (*Attagenus piceus*). This insect and its larva attack woolens, furs, and other materials and are particularly destructive to fabrics used in upholstered furniture and to woolen carpets and rugs. It is more resistant and harder to control than the common casemaking clothes moth or tapestry moth, and concentrations of materials found suitable for carpet beetle control have been found more than adequate for the control of the clothes moth.

A number of samples of white wool cloth were saturated with a 4 per cent solution of 2-hydroxy-3,5-diethyldiphenyl (boiling at 180°-190° C. at 10 mm. pressure) in methyl-ethyl ketone, thereafter pressed to remove excess treating solution, and dried. On each of a number of these samples, five larvae of the black carpet beetle were placed and the sample folded over the larvae. These infested cloth samples were placed in a closed cardboard box and examined from time to time to determine the amount of feeding or other attack directly attributable to the beetle larvae. Similar tests were simultaneously carried out on untreated samples of the woolen cloth, both control and test samples being incubated after infestation at temperatures of 85°-90° F. and at a relative humidity of 70-75 per cent. Examination of incubated samples impregnated with the 2-hydroxy-3,5-diethyl-diphenyl solution showed that after three weeks there had been no feeding by the larvae and that 60 per cent of the test larvae were dead. The untreated controls showed heavy feeding throughout the incubation period with a 100 per cent survival of the test larvae. Tests carried out over the same period upon cloth impregnated with methyl-ethyl ketone alone showed feeding by the larvae throughout the incubation period.

In a similar manner solvent-solutions of other alkyl-substituted hydroxy-diphenyls and halogen derivatives thereof were employed in the treatment of woolens and other textile materials subject to attack by moths. Materials so treated were mothproofed for an extended period of time without at the same time being stained or damaged by the mothproofing toxicant. Even after prolonged weathering, materials impregnated with these preservatives showed no discoloration and developed no odor attributable to the toxicant. The toxicant appeared to be preferentially absorbed from the treating solutions into the fibers of the subject material and showed no tendency to crystallize or be dusted out of the fabric. The following results are representative of those obtained with representative alkylated hydroxy-diphenyl compounds.

Table

| Compound | Concentration in methyl-ethyl ketone | Amount of feeding after three weeks | Mortality after three weeks |
|---|---|---|---|
| | Per cent | Per cent | Per cent |
| 2-hydroxy-5-ethyl-diphenyl (boiling at 155-160° C. at 10 mm. pressure) | 4 | 0 | 60 |
| 2-hydroxy-5-isopropyl-diphenyl (boiling at 160° C. at 7 mm. pressure) | 3 | 0 | 100 |
| 2-hydroxy-5-tertiary-butyl-diphenyl (boiling at 130°-133° C. at 2 mm. pressure) | 3 | 0 | 60 |
| 2-hydroxy-5-tertiary-amyldiphenyl (boiling at 153°-155° C. at 3 mm. pressure) | 4 | 0 | 80 |
| 2-hydroxy-5-tertiary-hexyl-diphenyl (boiling at 183° C. at 7 mm. pressure) | 5 | 0 | 0 |

Other solvents which may be employed in preparing treating solutions as described above are highly refined petroleum distillates; liquid halogenated hydrocarbon compounds, such as carbon tetrachloride, chloroform, ethylene chloride, trichloro-ethylene, chloro-benzene, and the like; hydrocarbon compounds, such as benzene, lower paraffin hydrocarbons, and toluene; the lower aliphatic alcohols, such as methyl, ethyl, or propyl alcohols, etc. If desired, the hydroxy-diphenyl derivatives may be applied to the subject material as constituents of emulsions with soap or other wetting, emulsifying, or detergent agents and water.

EXAMPLE 2

2.5 grams of 2-hydroxy-5-tertiary-butyl-diphenyl (boiling at 130°-133° C. at 2 millimeters pressure) was dissolved in sufficient of a petroleum distillate fraction (boiling at 345°-508° F. and having a flash point of 137° F.) to give 100 milliliters of solution. This solution was employed as a spray composition against three-day old houseflies according to the Peet-Grady method and substantially as described in Soap, 8, No. 4, 1932. The composition was found to knock down 42 per cent of the flies in 10 minutes and to kill 11 per cent in 48 hours. A control pyrethrin solution containing 100 milligrams of pyrethrins per 100 milliliters of the petroleum distillate was similarly tested and found to knock down 99 per cent in 10 minutes and to kill 38 per cent in 48 hours. A determination was also carried out on a petroleum distillate solution comprising 2.5 grams of the 2-hydroxy-5-tertiary-butyl-diphenyl and 50 milligrams of pyrethrins per 100 milliliters of solution. This composition knocked down 98 per cent in 10 minutes and killed 67 per cent in 48 hours of the flies sprayed therewith. The test solutions were substantially odorless and non-irritating, and those containing the 2-hydroxy-5-tertiary-butyl-diphenyl did not decompose or deteriorate on storage and exposure to light and air.

In a similar manner other 2-hydroxy-alkyl-diphenyls and 2-hydroxy-alkyl-halo-diphenyls were tested to determine their efficiency as fly spray toxicants when dissolved in non-corrosive organic solvents. The data set forth in the following table is representative.

Table

| Name | Concentration by volume | Knockdown in 10 minutes | Kill in 48 hours |
|---|---|---|---|
| | Percent | Per cent | Percent |
| 2-hydroxy-5-isopropyl-diphenyl | 3 | 90 | 57 |
| 2-hydroxy-5-normal-propyl-diphenyl (boiling at 185° C. at 19 mm. pressure) | 3 | 88 | 40 |
| 2-hydroxy-5-secondary-butyl-diphenyl (boiling at 163°C. at 6 mm. pressure) | 3 | 95 | 35.5 |
| 2-hydroxy-5-tertiary-amyl-diphenyl | 3 | 90 | 33 |
| 2-hydroxy-5-ethyl-diphenyl | 3 | 90 | 32 |
| 2-hydroxy-5-secondary-amyl-diphenyl (boiling st 173-175° C. at 6 mm. pressure) | 3 | 87 | 31 |
| 2-hydroxy-3-chloro-5-secondary-butyl-diphenyl (boiling at 151-154°C. at 2 mm. pressure) | 3 | 90 | 49 |
| 2-hydroxy-3-chloro-5-tertiary-butyl-diphenyl (boiling at 160-165° C. at 2 mm. pressure) | 3 | 80 | 40 |
| 2-hydroxy-3-bromo-5-tertiary-butyl-diphenyl (boiling at 175° C. at 3 mm. pressure) | 2 | 49 | 22 |

Petroleum distillate solutions of the above compounds were substantially non-irritating, odorless, and colorless, and did not stain surfaces upon which they were sprayed.

Mixtures of the foregoing compounds, as well as homologues wherein the alkyl substituent is in the ortho, meta, or para position with respect to the hydroxyl, may also be employed to obtain liquid spray materials having desirable characteristics as regards insecticidal toxicity, speed and percentage of knockdown and kill, and stability to heat and light. Likewise, these compounds may be employed to fortify and stabilize extracts of pyrethrum flowers, derris, cubé, barbasco, and related insecticidal plant products. Besides petroleum distillates, organic solvents such as benzene, ethylene chloride, hydrogenated naphthalene, butyl alcohol, and the like may be employed in the spray compositions. The phrase "non-corrosive organic solvent" as herein employed refers to any organic solvent material unreactive with and capable of dissolving the toxicants hereinbefore described and non-injurious to the skin and general health of humans.

The 2-hydroxy-diphenyl compounds with which this invention is particularly concerned may be prepared by reacting 2-hydroxy-diphenyl with a suitable alkyl halide in the presence of a Friedel-Crafts catalyst, such as aluminum chloride, aluminum bromide, etc. Such alkyl halides may be either normal, secondary, iso, or tertiary in configuration. The hydroxy-diphenyl and the alkyl halide can be reacted together in any desired proportion, maximum yields of the mono-alkyl substituted compounds being obtained when the hydroxy-diphenyl is present in the reaction mixture in considerable excess over the amount theoretically required. The yield of polyalkyl substituted derivatives ordinarily increases as the molecular proportion of alkyl halide to hydroxy-diphenyl is raised. The reaction is carried out in the liquid phase by adding the alkyl halide below the surface of a liquid reaction mixture comprising the 2-hydroxy-diphenyl and catalyst, and thereafter heating and stirring the mixture at temperatures preferably between about 75° and 175° C. until the reaction is complete. If desired, the reactants may be dispersed in an inert solvent such as carbon tetrachloride or ethylene chloride, in which case the use of somewhat lower reaction temperatures is practicable. The normal alkyl substituted hydroxy-diphenyls are conveniently prepared by the esterification of 2-hydroxy-diphenyl with straight chain fatty acids and subsequent rearrangement of the ester with anhydrous aluminum chloride to obtain ketonic bodies which are then reduced.

The 2-hydroxy-alkyl-chloro-diphenyls and 2-hydroxy-alkyl-bromo-diphenyls may be prepared by substituting 2-hydroxy-chloro- and bromo-diphenyls for the 2-hydroxy-diphenyl in the process described above. These compounds may also be formed by the partial hydrolysis of suitable alkyl-dihalo-diphenyl derivatives, e. f. 2,3-dibromo-5-tertiary-butyl-diphenyl, and the like.

The preparation and properties of a large number of the 2-hydroxy-alkyl-diphenyls and 2-hydroxy-alkyl-halo-diphenyls are disclosed in United States Patents 2,092,724, 2,092,725, 2,138,471 and in an application filed May 8, 1936, Serial No. 78,640, in all of which I am an inventor. Each of these patents and the application discloses the alkyl, alkyl-bromo-, and alkyl-chloro-hydroxy-diphenyls broadly as new compounds and discloses that these compounds are valuable generally as antiseptics and the like. The present invention distinguishes thereover in the discovery that particular sub-groups of these compounds are of value as insecticidal toxicants when dissolved in non-corrosive organic solvents.

Other modes of applying the principle of my invention may be employed instead of those explained, change being made as regards the materials employed, provided the products described in the following claims be thereby obtained.

I therefore particularly point out and distinctly claim as my invention:

1. An insecticide comprising a non-corrosive organic solvent having dissolved therein a compound having the formula

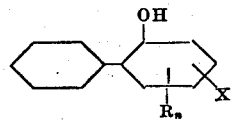

wherein R represents an alkyl radical containing not more than 6 carbon atoms, X represents a member of the group consisting of halogen and hydrogen, and $n$ is an integer not greater than 2, and as an added toxicant a product selected from the class consisting of the extracts of pyrethrin- and rotenone-bearing plants.

2. An insecticide comprising a non-corrosive organic solvent having dissolved therein an extract of a pyrethrin-bearing plant and as an added toxicant a compound having the formula

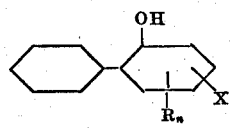

wherein R represents an alkyl radical containing not more than 6 carbon atoms, X represents a member of the group consisting of halogen and hydrogen, and $n$ is an integer not greater than 2.

3. An insecticide comprising a non-corrosive organic solvent having dissolved therein a compound having the formula

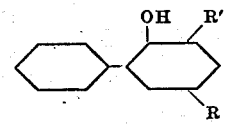

wherein R represents an alkyl radical containing not more than 6 carbon atoms, and R' represents a member of the group consisting of hydrogen and alkyl radicals containing not more than 6 carbon atoms, and as an added toxicant a product selected from the class consisting of the extracts of pyrethrin- and rotenone-bearing plants.

4. An insecticide comprising a non-corrosive organic solvent having dissolved therein a compound having the formula

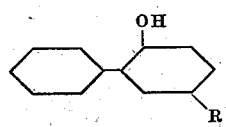

wherein R represents an alkyl group containing not more than 6 carbon atoms, and as an added toxicant a product selected from the class consisting of the extracts of pyrethrin- and rotenone-bearing plants.

5. An insecticide comprising a non-corrosive organic solvent having dissolved therein from 5 to 50 grams per liter of a compound having the formula:

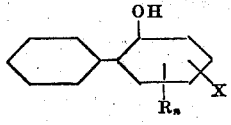

wherein R represents an alkyl radical containing not more than 6 carbon atoms, X represents a member of the group consisting of halogen and hydrogen, and $n$ is an integer not greater than 2, and as an added toxicant a product selected from the class consisting of the extracts of pyrethrin- and rotenone-bearing plants.

6. An insecticide comprising a petroleum distillate solution of from 5 to 50 grams per liter of a compound having the formula:

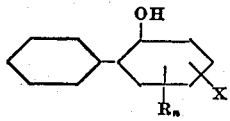

wherein R represents an alkyl radical containing not more than 6 carbon atoms, X represents a member of the group consisting of halogen and hydrogen, and $n$ is an integer not greater than 2, and as an added toxicant a product selected from the class consisting of the extracts of pyrethrin- and rotenone-bearing plants.

7. An insecticide comprising a non-corrosive organic solvent having dissolved therein 2-hydroxy-5-isopropyl-diphenyl, and as an added toxicant an extract of a pyrethrin-bearing plant.

8. An insecticide comprising a non-corrosive organic solvent having dissolved therein 2-hydroxy-5-tertiarybutyl-diphenyl, and as an added toxicant an extract of a pyrethrin-bearing plant.

9. An insecticide comprising a non-corrosive organic solvent having dissolved therein 2-hydroxy-5-tertiaryamyl-diphenyl, and as an added toxicant an extract of a pyrethrin-bearing plant.

GERALD H. COLEMAN.